G. MORITZ.
EYE SHIELD.
APPLICATION FILED MAR. 3, 1910.

984,017.

Patented Feb. 14, 1911.

Witnesses:

Inventor:
Gustave Moritz.
By Ralph Kalish, Atty.

UNITED STATES PATENT OFFICE.

GUSTAVE MORITZ, OF ST. LOUIS, MISSOURI.

EYE-SHIELD.

984,017.

Specification of Letters Patent.  Patented Feb. 14, 1911.

Application filed March 3, 1910. Serial No. 547,059.

*To all whom it may concern:*

Be it known that I, GUSTAVE MORITZ, a citizen of the United States, residing at the city of St. Louis, State of Missouri, have invented a new and useful Improvement in Eye-Shields, of which the following is a specification, reference being had to the accompanying drawings, forming a part hereof, in which—

Figure 1:
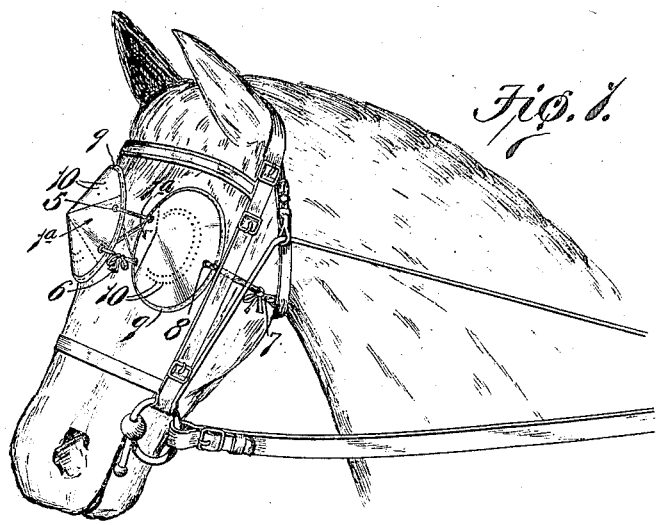
Figure 2:
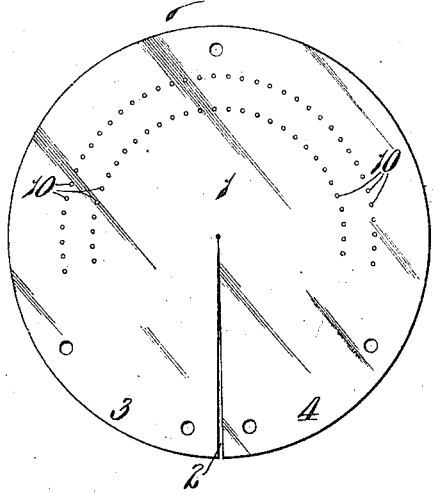
Figure 3:
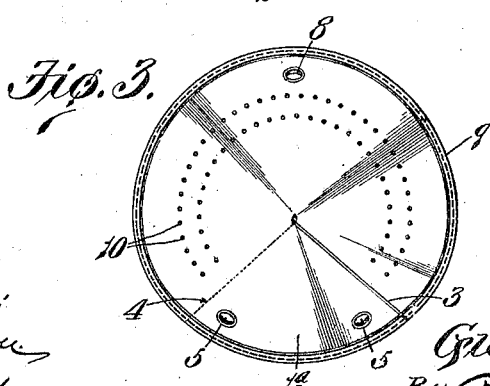

Figure 1 is a perspective view of a horse's head, showing my new eye-shields in position thereon; Fig. 2 is a plan view of a blank from which my new eye-shield may be made up; and Fig. 3 is a top plan view of my new eye-shield in finished or made-up form.

This invention relates to a new and useful improvement in eye-shields, the object being to provide an eye-shield which is durable, light in weight, and easily applied and held in proper position, which can be manufactured at comparatively slight cost, and which efficiently protects or shields the eye.

With this object in view, my invention consists in the novel form or construction of the eye-shield blank and in the novel form and construction of the finished or made-up eye-shield, all as will hereinafter be described and afterward pointed out in the claims.

In the drawings, 1 indicates the blank or sheet from which my finished eye-shield is made up. This blank or sheet 1 is preferably of some transparent, flexible material, such as celluloid, and is preferably of a shape so that the made-up or finished eye-shield will fit neatly and nicely over and around the eye, the blank being shown nearly circular in plan view, see Fig. 2. This blank or sheet 1 is slit or cut inwardly, as at 2, from its outer edge to substantially the center thereof, thereby providing what might be termed the integral, segmental flaps 3 and 4. The flaps 3 and 4 are adapted to be folded over and overlapped and secured together in any suitable manner, preferably by the rivets or eyelets 5, thereby forming the substantially cone-shaped or conoidal eye-shield shown particularly in Fig. 3, and providing the overlapped or reinforced portion 1ª in the finished eye-shield.

In use, my eye-shields are preferably adapted to be used in pairs, one for each eye, as shown in Fig. 1, the overlapped portion 1ª of each eye-shield being preferably placed adjacent each other on the forehead and between the eyes, so to speak, of the horse, the eye-shields proper being preferably adjustably held in relative position one to the other preferably by a lacing 6 passing through the eyelets 5 in said overlapped or reinforced portion 1ª, or by any other suitable means or in any other suitable manner. A cord, tape, or the like 7 passing under the horse's head and preferably secured at its ends in suitable openings or eyelets 8 in said eye-shields is preferably adapted to hold the pair of eye-shields in proper operative position over the eyes of the horse.

In order to better prevent the entrance of insects and the like under the edge of the eye-shield, and also to add to the attractiveness of the eye-shields and to protect and strengthen the edge thereof, I prefer to sew or otherwise secure around the edge of each eye-shield a suitable tape or the like 9, and I also prefer to provide each eye-shield with one or more series of ventilating perforations 10, for well understood purposes.

It will be seen that my eye-shield provides a covering for the eye which is very light in weight, which can be easily and cheaply manufactured, which is exceedingly durable and lasting, the body portion thereof being practically unbreakable, which can be used or worn without discomfort, and which efficiently protects and shields the eye; and while my new eye-shields are especially adapted for use on, and are herein shown and described as applied to, a horse, it is obvious that the same might be applied to other uses and that minor changes in the construction of the same might be made and substituted for that herein shown and described without departing from the nature and principle of my invention.

Having thus described my invention, what I claim and desire to secure by Letters Patent is:

1. The pair of eye-shields herein described, the same comprising the eye-shields proper, each of said eye-shields being made up from a nearly circular sheet of transparent flexible material having a slit inwardly from its edge to substantially the center thereof and being each provided with a reinforced portion formed by overlapping integral flaps, and means connected to said reinforced portions adapted to hold said eye-shields in proper relative position one to the other; substantially as described.

2. The pair of eye-shields herein described, the same comprising the eye-shields proper, each of said eye-shields being made up from a nearly circular sheet of transparent flexible material having a slit inwardly from its edge to substantially the center thereof and being each provided with a reinforced portion formed by overlapping integral flaps secured together, and means passing through said reinforced portions adapted to adjustably hold said eye-shields in proper relative position one to the other; substantially as described.

3. The pair of eye-shields herein described, the same comprising the eye-shields proper, each of said eye-shields being made up from a nearly circular sheet of transparent flexible material having a slit inwardly from its outer edge to substantially the center thereof and being each provided with a reinforced portion formed by overlapping integral flaps secured together, means passing through said reinforced portions adapted to adjustably hold said eye-shields in proper relative position one to the other, and means adapted to hold said pair of eye-shields in operative position; substantially as described.

4. The pair of conoidal eye-shields herein described, the same comprising the eye-shields proper, each of said eye-shields being made up from a nearly circular sheet of transparent flexible material slitted inwardly from its edge to substantially the center thereof to provide a pair of integral segmental flaps and said flaps being folded over, overlapped, and secured together to form said sheet into substantially a cone and to provide said eye-shield with a reinforced portion, means passing through said reinforced portions adapted to adjustably hold said eye-shields in proper relative position one to the other, and means adapted to hold said pair of eye-shields in operative position; substantially as described.

5. The pair of conoidal eye-shields herein described, the same comprising the eye-shields proper, each of said eye-shields being made up from a nearly circular sheet of transparent flexible material slitted inwardly from its edge to substantially the center thereof to provide a pair of integral segmental flaps and said flaps being folded over and overlapped to form said sheet into substantially a cone and to provide said eye-shield with a reinforced portion, and eyelets adapted to secure said flaps together in such overlapping reinforcing position, means passing through said eyelets adapted to adjustably hold said eye-shields in proper relative position one to the other, and means adapted to hold said pair of eye-shields in operative position; substantially as described.

In testimony whereof, I have signed my name to this specification, in the presence of two subscribing witnesses.

GUSTAVE MORITZ.

Witnesses:
GEORGE C. EICHBAUM,
CAROLINE L. WEBER.